UNITED STATES PATENT OFFICE.

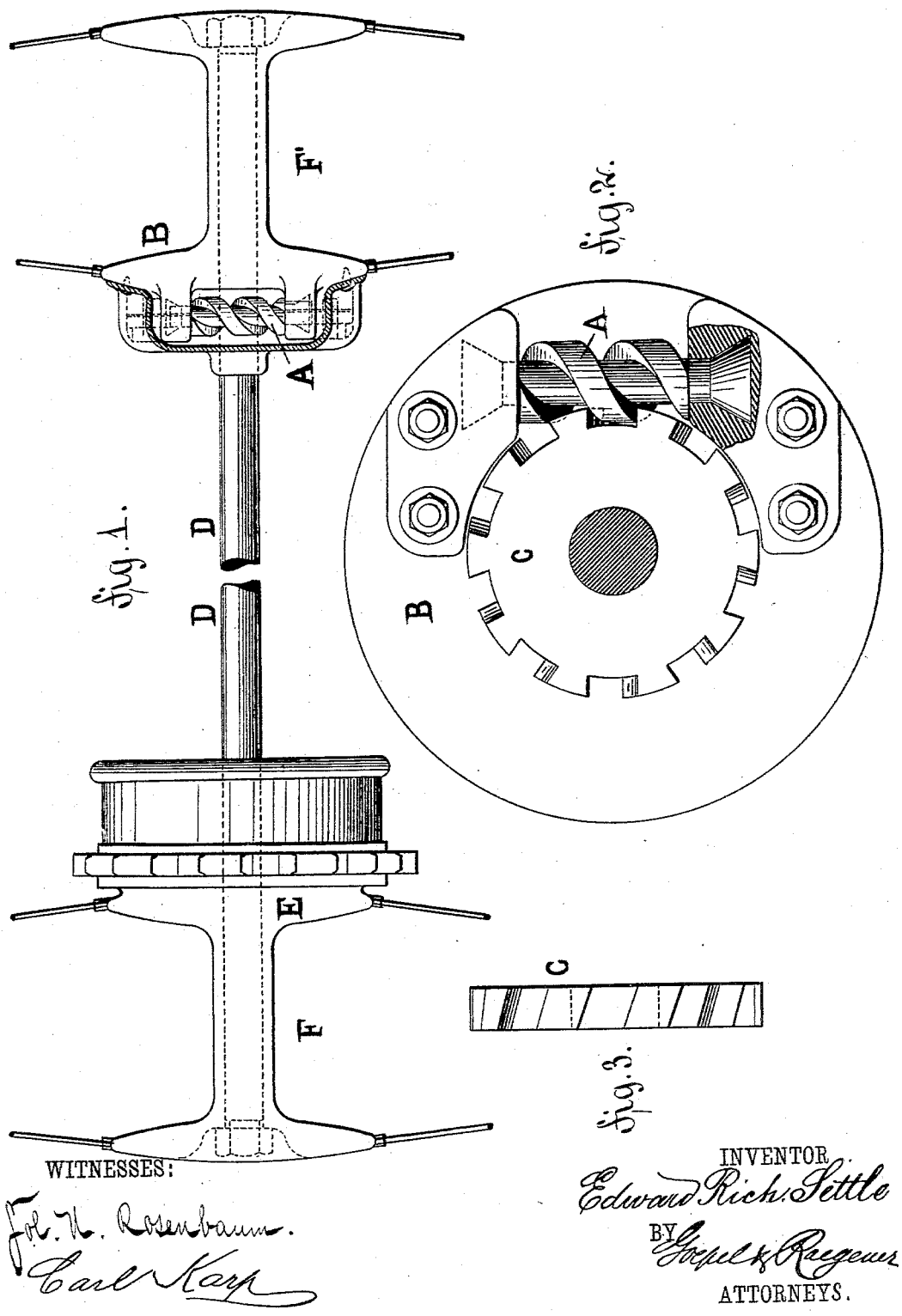

EDWARD RICHARD SETTLE, OF COVENTRY, COUNTY OF WARWICK, ENGLAND.

VELOCIPEDE.

SPECIFICATION forming part of Letters Patent No. 300,516, dated June 17, 1884.

Application filed April 9, 1884. (No model.) Patented in England December 3, 1883, No. 5,612.

*To all whom it may concern:*

Be it known that I, EDWARD RICHARD SETTLE, of Coventry, in the county of Warwick, England, velocipede-manufacturer, have invented certain new and useful Improvements in Tricyles and Like Velocipedes, (for which I have received Letters Patent in Great Britain, No. 5,612, dated the 3d day of December, 1883,) of which the following is a specification.

This invention has reference to improvements in driving mechanisms for tricycles or like velocipedes, and more especially to that form of driving mechanism known as "double driving," in which both wheels are driven together when traveling straight and revolve at different speeds when turning curves. Hitherto gears for the above-named purpose have been generally arranged by separate chains and clutches to each driving-wheel, or in such a manner that a chain wheel or box has carried a pinion or pinions carrying round toothed wheels (or pinions working one on the other) attached to the axles or the loose driving-wheels, and driving both wheels when the machine is going straight, and allowing either wheel to overrun the other when the machine is traveling in a curve. The disadvantage of this arrangement is that the machine is liable to swerve on striking a stone or other obstruction, owing to the absence of absolute or nearly absolute rigidity in the locking of both wheels to the driving-shaft when going straight. Now, my invention is designed to obviate this and to arrange a simple gear for causing both wheels to run at equal speeds when going straight and to run at different speeds when traveling in a curve or circle, said gear being adapted to the various forms of tricycles.

The invention consists of an axle extending across the machine, to which a driving-wheel is firmly fixed. To this wheel or this axle (near the wheel or in any other desired position) is fixed the chain-wheel or other transmitting mechanism. At the other end of the axle is fixed a worm wheel or wheels of suitable size and pitch. Adjacent to this worm-wheel is placed the other main wheel, running loose on the before-named driving-axle. Brackets or carriers fixed to the hub carry a worm or worms gearing with the before-named worm-wheel, which is fixed or keyed to the driving-axle. On transmitting motion from the crank-axis or pedal-lever to the axle, both wheels are caused to run at equal speeds when the velocipede is traveling straight, the worm or worms not revolving on the worm-wheel, which pulls the loose wheel round with the axle. When unequal strain (as in turning curves) is thrown on either wheel, the worm or worms are permitted to revolve, and the loose wheel runs at a variable speed to that of the axle carrying the fixed wheel.

In the accompanying drawings, Figure 1 is an elevation of an axle fitted with my gear, the box inclosing the gear being shown in section. Fig. 2 is a vertical transverse section through the axle on a larger scale, showing the driving-gear, the inclosing box or cover being removed; and Fig. 3, an end elevation of the worm-wheel.

Similar letters of reference indicate corresponding parts.

In adapting my invention to a tricycle or like velocipede, I have in Fig. 1 shown an elevation of an axle so fitted, whether applicable for use in a frame—say as is used in so-called "loop" or "T" or like frames for a front-steerer tricycle—or for use with a frame or a rear-steering or any other like type of tricycle, whether actuated by continuous transmission, such as a chain traveling over pitch-wheels, or by its equivalent, a train of wheels located, respectively, on the crank and driven axles, or by intermittent transmission, as by a clutch put in action by the depressions or oscillations of lever-treadles.

A shows the worm working in bearings attached to or carried by the hub B. These bearings can be formed by being half cast on the hub, and the other half being bolted or screwed over the spindle of the worm. The ends of the worm are formed in the shape of a truncated cone, to take up the lateral thrust as the worm revolves in either direction, as shown clearly in Fig. 2.

C is the worm-wheel keyed to the axle D. The inclination of its teeth corresponds to the thread of the worm, both of which can be varied according to the degree of pressure necessary to render the worm inactive till the machine deviates from a straight path. The driving-axle D carries a chain-wheel, E, and a main wheel, F, which is keyed or otherwise secured fast to the axle. The axle runs through the hub of the opposite main wheel, F', which is loose upon it. The worm A is carried by the hub of the wheel F'; or these arrangements can be reversed by putting the worm-wheel C on the hub of the wheel F' and carrying the worm on centers attached to the axle or shaft D. The pressure of the worm-wheel C is distributed along the axis of the worm A, which suffices to keep the loose main wheel F' locked while running straight, while the resistance of the worm is overcome when running in a curve or circle, in which case the worm, which before has been at rest, becomes active, its motion being accelerated or retarded, according to the radius of the circle or curve described by the wheels. Practical tests have shown that a worm three-quarters of an inch in diameter and three-quarters pitch and a worm-wheel of ten teeth answer the purpose. Two or more worms may be adopted in place of one, and the sizes of the worm-wheels, the pitch of the worm, and the number of threads be varied, as may be found most desirable or advantageous; and my invention can be applied to other parallel-wheeled velocipedes than tricycles.

Having thus described my invention, I claim as new and desire to secure by Letters Patent—

In tricycles or velocipedes, the combination of the driving-axle having a fixed and a loose main wheel, a worm-gear keyed to the axle, and a worm turning in bearings of the hub of the loose wheel, said worm-gear locking the loose wheel to the axle, so that both wheels run at the same speed when the velocipede is traveling straight, but allowing the loose wheel to run at a different speed to the fixed wheel when the velocipede is traveling in a curve or circle, substantially as set forth.

In testimony that I claim the foregoing as my invention I have signed my name in presence of two subscribing witnesses.

EDWARD RICHARD SETTLE.

Witnesses:
W. WILTON POPPLEWELL,
*Victoria Chambers, Southampton Bds., W. C.*
W. A. GREEN,
*5 Nicholas Lane, Lombard St.*